April 5, 1932. G. J. HOLANBEK 1,852,778
AUTOMATIC BRAKE FOR TRAILERS
Filed March 4, 1931   2 Sheets-Sheet 1
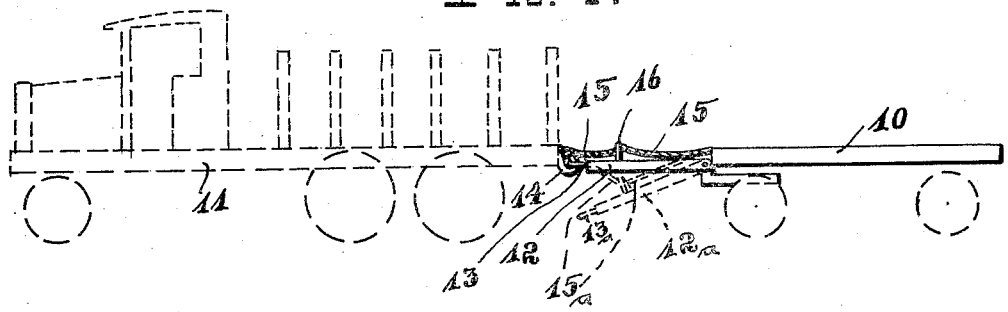
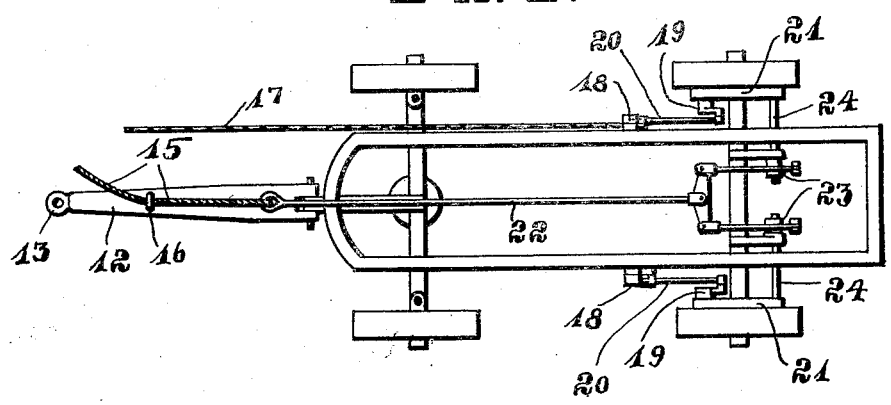
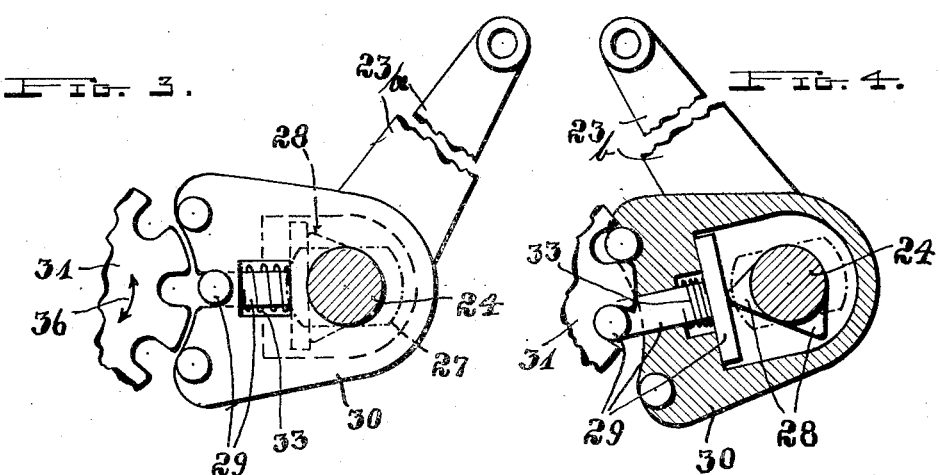
INVENTOR:
GUSTAV J. HOLANBEK, INVENTOR:
GUSTAV J. HOLANBEK,
By: Otto H. Ringer,
his Atty.

Patented Apr. 5, 1932

1,852,778

UNITED STATES PATENT OFFICE

GUSTAV J. HOLANBEK, OF LOS ANGELES, CALIFORNIA

AUTOMATIC BRAKE FOR TRAILERS

Application filed March 4, 1931. Serial No. 519,915.

This invention relates to devices used for stopping trailers in their movements on becoming detached from the main or leading vehicle.

One of the main objects of this invention is to provide an automatically functioning braking-mechanism in conjunction with the customary connecting pole or tongue and the brake-actuating rope or member, to result in a proper operation of the brake-actuating member on any dislocating of the connecting pole by means of the pole.

Another object is to provide for an automatic stop of a trailer in the forward as well as reverse direction.

Another object is to provide for an automatic release of the automatic braking-mechanism after a proper readjustment of the connecting pole in a forward or rearward direction.

Other objects will appear from the following description and appended claims as well as from the accompanying drawings, in which—

Fig. 1 is a rough outline of a leading vehicle, such as an automobile-truck, and a connected trailer, illustrating the braking rope somewhat loosely hanging above the connecting pole, in which condition these parts will generally or customarily appear when everything is in proper operating order.

Fig. 2 is a fragmentary top plan view of a trailer, illustrating the cooperative relation between the customary braking mechanisms and automatic braking mechanisms according to this invention.

Fig. 3 is a cross section through the actuating mechanism for the automatic brake-operating device in neutral position.

Fig. 4 is a similar section as in Fig. 3, with the mechanism in its initial engaging position.

Figure 5:
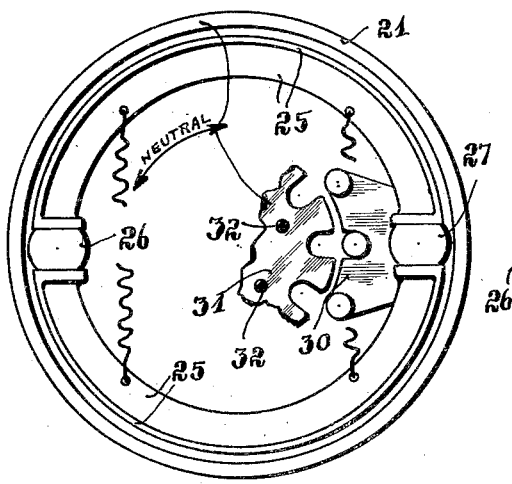
Fig. 5 is a cross section through a brake-drum of the customary type with a customary brake-actuating cam besides cam and actuating mechanisms for automatically setting a common brake-band or pair of brake-shoes within the drum in inoperative or neutral position.

As illustrated in the drawings, a trailer 10 is customarily attached to the rear end of a leading vehicle, such as an automobile-truck, indicated at 11, by means of a connecting tongue or pole 12, of which the forward end 13 is formed to engage with the hook 14 on the rear end of the vehicle 11.

For actuating the brakes or similar means of the trailer, a rope 15 or similar flexible member is preferably used to lead to the seat of the driver on the truck by means of which the driver can control the movements of the trailer from his seat.

In this case, an eye-bolt 16 or any other similar suitable member is preferably provided on the pole by which the flexible member is normally supported somewhat loosely so as not to apply any strain or force on any of the parts of the braking facilities of the trailer.

On any breaking away of the trailer from the leading vehicle, such as by a disconnection of any sort of the pole 12 from the rear end of the leading vehicle, the pole 12 will have the tendency to act on the flexible member, either by falling downwardly, as illustrated in Fig. 1, or by rapidly swinging back and forth in a sidewise direction as the swingable front wheels of the trailer hit rough parts in the road over which the vehicles pass.

Any jerking movement of the pole, transmitted by the supporting or guiding member 16 to the flexible member 15 is made use of in this case to actuate an emergency automatic brake or stop for the trailer.

The customary or regular actuating member 17, also leading to the seat of the driver, by means of the levers 18 and 19 and the connecting rod 20, enables the driver to actuate the main brakes outlined at 21 in the ordinary manner.

The flexible member 15, by means of the rod 22 and the levers 23 on the shafts 24, on the other hand, also applies to the main brakes 21.

Considering that each of the main brakes outlined at 21 may embody a customary brake-drum, brake bands or shoes 25, and operating cams 26 and 27, in the manner illustrated in Figs. 5, 6, 7, and 8, it will be clear that the customary manual setting of the brakes as well as an automatic actuation of the brakes may be effected through common brake parts.

However, it must be understood that I do not limit myself to such combined arrangement and that separate and distinct brake-drums and other parts can be provided for the regular manually operated brakes on the one side, and similar parts for the automatically operated brakes on the other side.

Nevertheless, the illustrated simpler combined arrangement under a common drum may be considered as the preferred form, and, in this, the cam 26 is operative by the lever 19, under cooperative control by means of the member 17 for manual operation; while the cam 27 is operative by the shaft 24 for the automatic control by means of the member 15.

Figure 9:
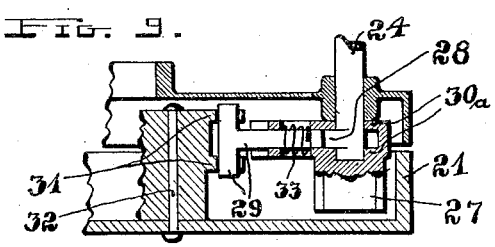
Fig. 9 is a fragmentary cross section through a brake-drum with the automatic brake-actuating mechanism in engaging position without the brake-shoes, illustrating the cooperative relations and positions of the different parts as seen approximately in the direction of the arrows 9—9 indicated in Fig. 7.

While the lever 19 is in the customary manner directly applicable to the cam 26, the otherwise similar lever 23, being mounted on a common shaft together with a cam 28, which for the sake of differentiation may hereafter be called lug 28, is merely turnable with respect to a pawl-structure 29, as more clearly illustrated in Figs. 3, 4, and 9.

The lug 28 merely abuts against the shiftable actuating pin device 29 without actually turning or directly being responsible for the turning or swinging movements of the pawl-structure 30.

Providing the lug 28 as securely mounted on or as an integral part of the shaft 24 makes both parts act together, and, as illustrated in Fig. 9, the shaft 24 being turnable in the two side-members 29a, the lug 28 is apt to swing or move freely between these side-members of the pawl-structure 30 whenever the shaft 24 is turned or actuated by the connected lever mechanism and flexible member 15.

A brake-drum is generally and also in this case firmly secured to the wheel upon which it is to act, though not particularly illustrated so in the drawings.

In order to transmit the turning movement of the wheel to the automatic brake-actuating mechanism, a sprocket-wheel or gear-pinion 31 is also firmly secured to the wheel by any suitable means, in Fig. 9 the pinion being indicated as secured by rivets 32 to the drum 21, which, of course, serves the same purpose.

A turning of the shaft 24, whereby the lug 28 forces the pin-device against the tension of the spring 33 so as to bring this pin-device 29 into engagement with the pinion 31 in the manner illustrated in Fig. 4, results in a tilting of the pawl-structure 30 to an extent that the pin 34 comes also into engagement with the pinion 31 on a turning of the wheel to which the pinion happens to be attached in the direction of the arrow 35.

Inasmuch as the pin-device has no other duty to perform but to tilt the pawl-device it can naturally be of light construction and design, and the spring 33 also is comparatively light, so that it will be clear from the above that very little force is necessary to actuate the lug 28 by a turning of the shaft 24, which, in turn, requires very little stress to be applied to the lever-mechanism and attached flexible member 15.

The pole 12 is for the above reasons not necessarily of any undue large or bulky or heavy form or type, and any pole customarily used for such purposes can easily operate the automatic brake-mechanism disclosed here.

While Fig. 4 illustrates the operating position of the lever as indicated at 23b in conjunction with the cooperative positions of the lug 28 and the pin-device 29, in Fig. 3, the lever is shown in inoperative position as indicated at 23a with respect to the corresponding inoperative positions of the lug 28 and the pin-device 29, in which case the pinion 31 may freely turn in either direction as indicated by the double arrow 36 without affecting the pawl-structure in any manner.

In Fig. 5, a brake-drum with all the above referred-to cooperating parts illustrate the manner in which such parts appear in neutral inoperative position, the brake-shoes 25 to be operative by any regular or customary braking or brake-actuating means by means of the cam 26 and at the same time operative by the automatically operative cam 27.

Figure 6:
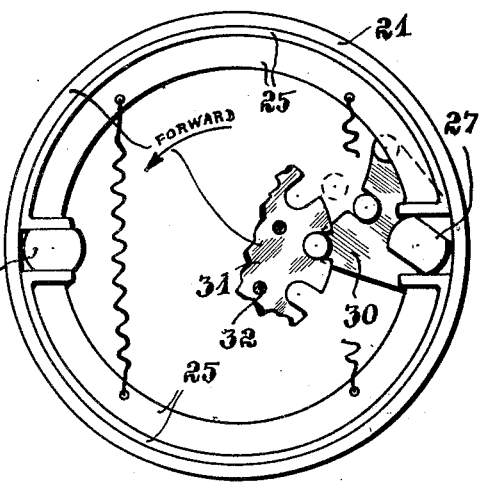
Fig. 6 is a similar section as in Fig. 5 with the automatic brake-mechanisms and cooperating cam in braking position by a forward movement of the wheel to which the drum is normally attached.

In Fig. 6, the brake-shoes are illustrated in operative position resulting from an actuation of the automatic brake-mechanism when an attached wheel is moving in a forward direction.

Figure 7:
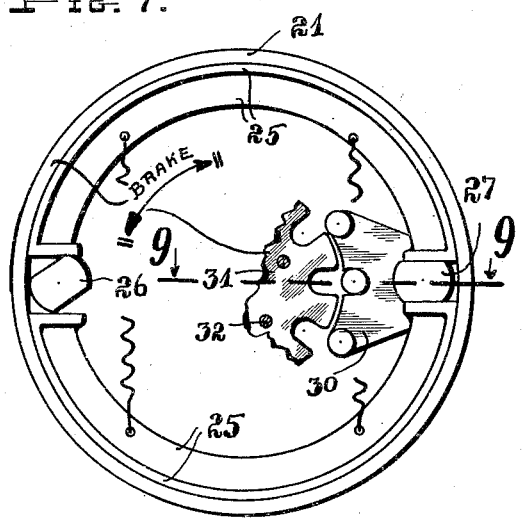
Fig. 7 is a similar section as in Fig. 5 with the customary brake-cam holding the brake-shoes in set position while the automatic brake-setting mechanisms are illustrated in neutral position.

In Fig. 7, the operative position of the brake-shoes resulted from an actuation of the customary brake-mechanism while an attached wheel may have moved in either direction as indicated by the double arrow, the automatic brake-mechanism being shown unaffected thereby.

Figure 8:
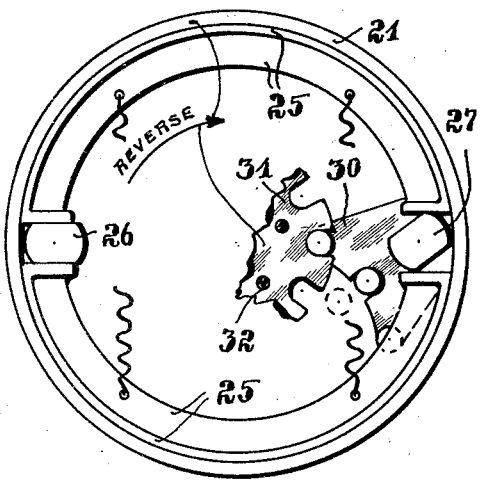
Fig. 8 is a similar section as in Fig. 5 with the automatic brake-mechanisms and cooperating cam in braking position by a rearward or reverse movement of a wheel to which the drum is normally attached though not shown in the drawings, while the common brake-cam is in neutral position as in Fig. 6.

In Fig. 8, the operative position of the brake-shoes resulted from a setting by the automatic brake-mechanism while an attached wheel moved in the reverse direction.

From the above it must be understood that after an automatic setting of the brakes, a dislocated poll may only be placed in proper connecting position, to bring the flexible member 15 to the loose condition in which it is illustrated in Fig. 1, and, by moving the trailer a very short distance in the opposite direction with respect to which it had been moving before the setting of the brakes, the brakes will automatically resume the inoperative position and condition.

Whether moving up-hill or down-hill, this automatic braking mechanism operates equally well. On an up-hill move, it may have to be taken into consideration that the automatic braking mechanism may have been operated twice, eventually forward momentarily, if the trailer had a suitable forward momentum upon becoming detached from the leading vehicle, and, then again, immediately rearward since the detached pole would keep the pin-device in engaging position to effect a movement of the pawl-structure in the opposite direction without a stop in the neutral position to which the pin-device will otherwise normally have a tendency to move as soon as the whole automatic mechanism is released. In such a case, the driver has only to attach the trailer properly and just go ahead without further attending to the brakes of the trailer.

While trailers have become detached unnoticed by the driver of a leading vehicle as long as the trailers followed the leading vehicle a suitable distance close behind the leading vehicle, however, to the great jeopardy of others on the road, the trailers eventually swerving dangerously to one side or the other, such accidents cannot happen with this automatic brake setting device, since a detached pole will swing enough either downward or to the sides to effect a setting of the brakes of the trailer.

Having thus described my invention, I claim:

1. In an automatic brake, in combination with a leading vehicle, a trailer, and a connecting pole between the said vehicle and trailer, a flexible member operatively supported by said pole and leading from the trailer to the said vehicle, a brake-drum turnable by the wheel of the said trailer, a pinion also turnable by the same wheel, brake-setting means operatively mounted in said drum, and a yielding engaging device operatively connected to said flexible member and adapted to bring the brake-setting means into engagement with said pinion.

2. In an automatic brake, in combination with a leading vehicle and a trailer connected by a pole, a brake-drum turnable by a wheel of the said trailer, a pinion also turnable by the same wheel, brake-setting means for said drum, an engaging device in operative relation to said brake-setting means and said pinion, and an operating member operative by a disarrangement of said pole with respect to said vehicle and said trailer and operatively connected to said engaging device and adapted to bring said brake-setting means into engagement with said pinion.

3. In an automatic brake, in combination with a leading vehicle and a trailer connected by a pole, a brake-drum turnable by a wheel of the said trailer, a pinion also turnable by the same wheel, brake-setting means for said drum, an engaging device in operative relation to said brake-setting means and said pinion, an operating member operatively connected to said engaging device and loosely stretching across the gap between said vehicle and trailer, and a supporting member on said pole in engagement with said operating member and adapted to impart an operating stress to the operating member when the pole becomes disarranged with respect to said vehicle and trailer.

In testimony that I claim the foregoing as my invention I have signed my name.

GUSTAV J. HOLANBEK.